US009117336B2

(12) United States Patent
van Linden

(10) Patent No.: US 9,117,336 B2
(45) **Date of Patent: *Aug. 25, 2015**

(54) CUSTOMIZABLE GAMING TABLE APPARATUS

(71) Applicant: Gaming Support B.V., Rotterdam (NL)

(72) Inventor: Lucien Maurice van Linden, Maasland (NL)

(73) Assignee: GAMING SUPPORT B.V., Rotterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/208,701

(22) Filed: Mar. 13, 2014

(65) Prior Publication Data

US 2014/0191474 A1 Jul. 10, 2014

Related U.S. Application Data

(63) Continuation of application No. 13/747,103, filed on Jan. 22, 2013, now Pat. No. 8,684,360.

(60) Provisional application No. 61/588,560, filed on Jan. 19, 2012.

(51) Int. Cl.

| | |
|---|---|
| ***A63F 13/00*** | (2014.01) |
| ***G07F 17/00*** | (2006.01) |
| ***G07F 19/00*** | (2006.01) |
| ***F21S 4/00*** | (2006.01) |
| ***G07F 17/32*** | (2006.01) |
| ***A63F 13/90*** | (2014.01) |
| ***A63F 1/06*** | (2006.01) |

(52) U.S. Cl.
CPC .............. *G07F 17/322* (2013.01); *A63F 1/067* (2013.01); *A63F 13/08* (2013.01)

(58) Field of Classification Search
CPC ......... A63F 1/067; A63F 13/08; A63F 13/90; A63F 2003/00164; G07F 17/322
USPC .......... 463/1, 30–32, 46, 47; 273/148 R, 287, 273/309; 362/234, 249.06
See application file for complete search history.

(56) References Cited

U.S. PATENT DOCUMENTS

| | | | | |
|---|---|---|---|---|
| 3,778,063 A * | 12/1973 | Strand | 273/237 |
| 4,807,095 A * | 2/1989 | Bell | 362/127 |
| 5,839,960 A * | 11/1998 | Parra et al. | 463/41 |
| 6,270,404 B2 * | 8/2001 | Sines et al. | 463/12 |
| 7,380,791 B2 * | 6/2008 | Gauselmann et al. | 273/142 B |
| 7,661,836 B1 * | 2/2010 | Naranjo | 362/102 |
| 7,976,372 B2 * | 7/2011 | Baerlocher et al. | 463/12 |
| 8,684,360 B2 * | 4/2014 | van Linden | 273/309 |
| 2002/0077170 A1 * | 6/2002 | Johnson et al. | 463/16 |
| 2004/0072609 A1 * | 4/2004 | Ungaro et al. | 463/17 |
| 2005/0026680 A1 * | 2/2005 | Gururajan | 463/25 |
| 2005/0282623 A1 * | 12/2005 | Matsuno et al. | 463/25 |
| 2006/0287068 A1 * | 12/2006 | Walker et al. | 463/25 |
| 2009/0124379 A1 * | 5/2009 | Wells | 463/31 |
| 2011/0065513 A1 * | 3/2011 | Nordahl et al. | 463/46 |
| 2011/0115158 A1 * | 5/2011 | Gagner et al. | 273/274 |
| 2012/0080845 A1 * | 4/2012 | Emori et al. | 273/309 |

* cited by examiner

*Primary Examiner* — Milp Shah
(74) *Attorney, Agent, or Firm* — Howard & Howard Attorneys PLLC

(57) ABSTRACT

A gaming table including a plurality of illumination devices mounted therein and a controller configured for receiving a selection of a preset game layout configuration from one or more preset game layout configurations stored in memory and actuating the illumination of a portion of the plurality of illumination devices corresponding with the selected preset game layout configuration.

20 Claims, 5 Drawing Sheets

CUSTOMIZABLE GAMING TABLE APPARATUS

CROSS-REFERENCE TO RELATED APPLICATIONS

This application is a continuation of U.S. patent application Ser. No. 13/747,103, filed Jan. 22, 2013, now U.S. Pat. No. 8,684,360, which claims priority to U.S. Provisional Patent Application No. 61/588,560, filed Jan. 19, 2012, the disclosures of which are incorporated herein by reference.

BACKGROUND OF THE INVENTION

The invention relates generally to electronic gaming equipment, and more particularly, to an electronic gaming table apparatus that can facilitate game play for one or more players and is customizable to provide various gaming layouts and images to facilitating game play thereon.

A significant amount of gaming occurs at live table games that use playing cards and a live dealer. Exemplary live table games include blackjack, poker, baccarat and poker variants. Each of these live table games are facilitated through the use of a specialized table including areas defined on the table felt or surface as player positions which are intended to accommodate the needs of multiple players during play of the underlying game. Each player position may include designated locations defined on the table for the placement of implements used in the underlying game, such as playing cards, and for wagers to be placed in the form of a tokens or chips, including ante wagers, game wagers, side wagers and the like. Gaming operators require that dealers and players maintain implements of the game and wagers placed in such designated locations defined on the table for security and regulatory reasons, among other things.

Generally speaking, the gaming floor or "pit" in any casino will have multiple gaming tables of a specific game installed for use by players. Multiple gaming tables of the same game installed in which different minimum and maximum wagers are allowable may also be available. The amount of gaming tables used for any one game may be selected by a combination of factors including the popularity of the underlying game, strategies applied by the gaming operator to appeal to certain types of players and limitations set forth in the license agreements of proprietary games that limit the amount of tables which may be provided.

It should be readily apparent that once a gaming table is installed with a specific game it is time-consuming, cumbersome and requires staff and some down-time to be removed and replaced with another game, even if only the felt layout is removed and replaced. Furthermore, the player positions are static and may not be changed, regardless of how many players are actually playing the underlying game at any one time.

A number of attempts have been made to design and provide partial or fully automated gaming machines that duplicate play of live table card games. For example, video poker slot games and slot-type blackjack games for single players. In those systems, the individual player sits at an individual machine, inserts credits/currency/coins, and plays a one-on-one game that is controlled by a processor in the machine or to which the machine is distally connected through a communication network. These machines are common provided in casinos but do not duplicate the ambience of the casino table game with multiple players present.

Another type of attempt for simulating live table card games is through the use of multiplayer gaming machines having a bank of individual player positions associated with a single dealer position in an attempt to simulate the physical ambiance of a live casino table card game. Some of these systems have a video display of a dealer, virtual cards or chips, and have individual monitors for display of the players' hands and the dealer hands. The architecture of such systems is generally been designed on a unique basis for each game, and there tends to be a main computer/processor that drives all elements of the game, or multiple computers/processors that distribute the video control of the dealer image and the remainder of the game elements between the two distinct computer/processors. This tends to maximize the cost of the system and tends to provide a slow system with high processing power demands to keep the operation working at speeds needed to maximize use and profit from the machines. Furthermore, once the machine is installed, it is even more cumbersome to remove and replace than a gaming table.

SUMMARY OF THE INVENTION

The invention relates generally to a gaming table apparatus which resolves the aforementioned issues in the art, among other things. The term gaming table or gaming table apparatus as used herein is to be construed broadly. It can relate to any platform on which gaming or game play is provided in a gaming establishment or casino through the use of physical gaming implements, such as playing cards, chips, credit, cash, and/or embedded electronic interfaces in the gaming table for facilitating game play through virtual representations of gaming implements.

Some embodiments are directed to a gaming table apparatus including: a substrate layer defining a first surface and an opposing second surface; a protective layer, wherein the protective layer includes a layer of resilient material adjacent to the first surface of the substrate layer and a fabric layer disposed over the layer of resilient material; a plurality of illumination devices mounted in the substrate layer, wherein each of the illumination devices includes an elongated lens with a portion thereof extending from the first surface of the substrate layer and through the layer of resilient material; a memory device for storing data relating to one or more preset game layout configurations, wherein each preset game layout configuration may provide positional data relating to one or more designated areas to be defined on the protective layer for the placement of gaming implements which facilitate game play at the gaming table; a controller configured for receiving a selection of a preset game layout configuration from the one or more preset game layout configurations stored in memory; and a power source responsive to the controller device and in electrical communication with the plurality of illumination devices for providing power to cause the illumination of a portion of the plurality of illumination devices corresponding with the selected preset game layout configuration.

In some embodiments, the aforementioned gaming table may further include a support layer adjacent to the second surface of the substrate layer. A base may be connected with the support layer for supporting the substrate layer horizontally.

In some embodiments, the illumination devices of the aforementioned gaming table are micro lights, LED lamps or incandescent lights.

In some embodiments, the designated areas are shapes and may include indicia or words.

In some embodiments, the controller includes a display device and is further configured for providing a display of the preset game layout configurations stored in memory.

In some embodiments, each elongated lens contacts the fabric layer. The elongated lens may be rectangular or a cylindrical tube with a flat, square or circular capped end.

In some embodiments, the protective layer further includes a layer of a rigid transparent material positioned between the resilient layer and the fabric layer, and each elongated lens contacts the rigid transparent material.

In some embodiments, the plurality of illumination devices are mounted in the substrate layer as an array of devices.

In some embodiments, the protective layer and substrate layer define a generally semi-circular shaped planar surface.

Some embodiments of the invention are also directed to a gaming table device which comprises: a composite table surface formed by a display device layer disposed between a supporting underlayer and a protective outerlayer; a table support stand for supporting the composite table surface in a generally horizontal plane; a processing device for facilitating the processing of image or display data for causing an image to be displayed on the display device, and memory for storing image data relating to preset game layouts, among other things.

In some embodiments, the display device layer is composed of an array of illuminating lamps. The illuminating lamps may include LEDs or other light sources, which are mounted within a substrate material having desirable properties, such as an insulating and resilient material capable of being worked with. For example, a medium density fibreboard (MDF) material may be employed. Any number of lamps or light source may be employed in the display layer.

In some embodiments, the supporting underlayer may be a material selected for its strength and durability, such as metal, plastic, wood, wood-composite or MDF.

In some embodiments, the protective outerlayer may comprise one or more layers, some of which may be light permeable and allow for the transmission of light generated by the display device layer therethrough, such as a plastic or glass. The outerlayer may also include one or more semitransparent or transparent rubberized, cloth or thermoplastic layers. Plastics may include a semitransparent or transparent PVC, PMMA (acrylic) or similar materials. The multiple layers may include various combinations of materials which allow for the light generated by the display device to be viewable on the outer layer surface.

Computing components, such as a processing device and memory, may be used to store various programs and applications that provide for the operation of the gaming table apparatus. In particular, such components may be used to facilitate the display of various table game layouts via the display device layer on the composite table surface, and in various formats that adjust for various factors relating to the game. In some embodiments, the gaming table apparatus is in communication with a larger system, such as a network or the Internet and configured for transmitting and receiving a variety of data. In some embodiments, the gaming table apparatus is further operatively associated with a player identification device, such as a card reader for player tracking cards.

For example, the player positions may be adjusted to better accommodate the number of players currently in the game or to comfortably allow for various numbers of players that wish to enter the game above the normal amount found at a conventional gaming table. Side wager offerings, bonusing or other special customizable features may be facilitated through the display of images on the composite table surface by the display device layer in cooperation with the computing components of the apparatus. For example, the images may include presentations of indicia, words and shapes on the composite table surface to designate player positions, identify the respective wagering locations and provide visible win/loss or bonus award notifications. Other images which may be provided through the gaming apparatus include player loyalty program information, advertising, marketing or messages from the operator or casino host.

In some embodiments, the gaming table apparatus further includes audio device which enables multimedia capability for the gaming table apparatus.

In some embodiments, the gaming table apparatus is configured to display playing card or hand values on the composite table surface. In some embodiments, the gaming table apparatus is operatively associated with a random number generator for providing randomly generated bonuses or for facilitating game play through the composite table surface.

In some embodiments, the display device layer and protective outerlayer are constructed and configured to provide touch-enabled functionality. In such embodiments, players may interact with the composite table layer to, among other things, place wagers in the underlying game.

BRIEF DESCRIPTION OF THE DRAWINGS

Other advantages of the invention will be readily appreciated as the same becomes better understood by reference to the following detailed description when considered in connection with the accompanying drawings wherein.

DETAILED DESCRIPTION OF VARIOUS EMBODIMENTS OF THE INVENTION

Figure 1:
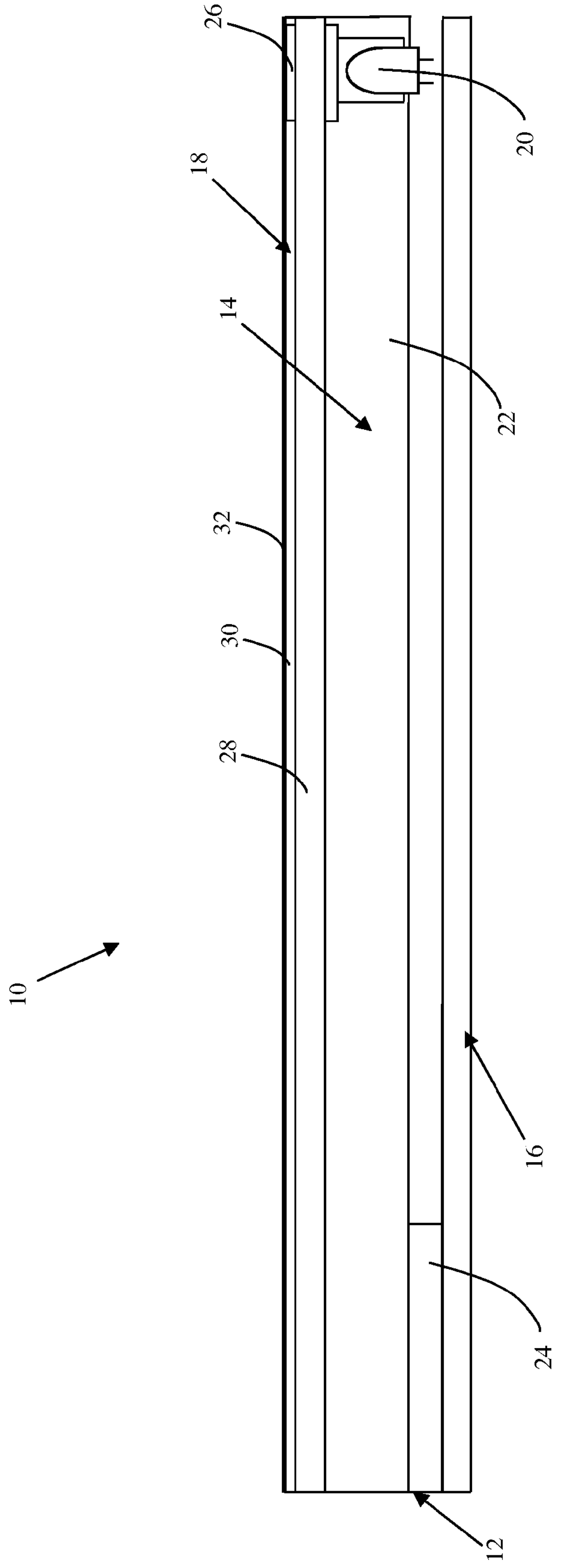
FIG. 1 is a partial cross-sectional schematic representation of an exemplary table top for a gaming table apparatus constructed in accordance with an exemplary embodiment of the invention.

The following description of various embodiments of the invention reference features which may be shown in some drawings and not in others or the same reference numbers may be used in multiple drawings for various embodiments for convenience only. In accordance with the principles of the invention, any feature described herein or shown in a drawing may be referenced and/or claimed in combination with any other feature described herein or shown in the drawings. Furthermore, it should be understood that the drawings provide representations which may not be to scale or may not include certain components which would be readily apparent to those of skill in the art in order to teach the embodiments of the invention in a manner which would facilitate its manufacture and use, and for convenience sake, among other things.

Figure 2:
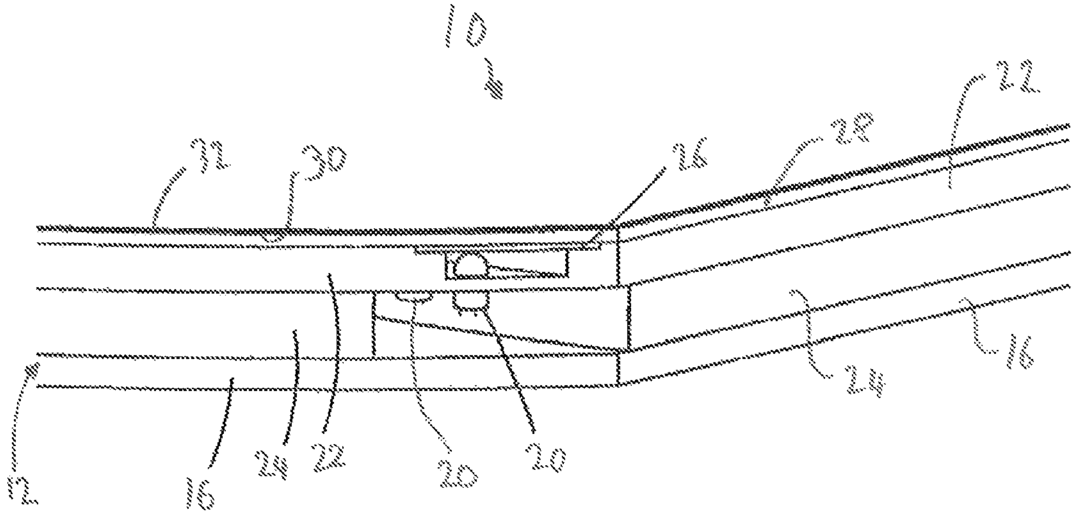
FIG. 2 illustrates another partial cross-sectional view of the exemplary table top shown in FIG. 1.

FIGS. 1 and 2 illustrate an exemplary embodiment of a gaming table of the invention generally identified by the reference numeral 10. Gaming table 10 includes a composite table top 12 comprising an illumination or display device layer 14 positioned between a support layer 16 and an outer protective layer 18.

In this embodiment, display device layer 14 is composed of one or more LED light sources 20 mounted in a substrate 22, wherein electrical contacts or wiring therefor may be disposed within an insulating layer 24 defined between substrate 22 and support layer 16. For simplicity of illustration only a single LED 20 is shown in the figure, however, it should be understood that a plurality of such LEDs or other illumination devices, configured in an orderly array or otherwise, may be mounted in substrate 22 and configured to illuminate to form various patterns, indicia, shapes and colors in accordance with the invention. The illumination devices may be micro-LEDs and/or any other type of light source that is in a resolution that is high enough for a human eye whereby any and all sorts of visual information can be displayed, including information such as pay tables for the underlying game. A transparent or semi-transparent material referred to as lens 26 is disposed over light source 20. In this embodiment lens 26 extends through a portion of outer protective layer 18 to allow for the transmission of light from LED 20 to be visible through protective layer 18 of table top 12.

Outer protective layer 18 in this embodiment includes a first layer 28 which may be constructed of a flexible but resilient material, such as a rubberized foam material, a second layer 30 of a firmer material, such as plastic, and a covering layer 32 which may be constructed of a relatively thin cloth material, fabric, felt or alternatively a soft PVC material. Layer 32 may further include printed matter thereon. It should be understood that layer 18 is intended to protect display device layer 14 while providing a surface which is comfortable for players and attractive, but may be constructed differently and is not to be limited to the construction described herein. As shown, lens 26 extends through the resilient material layer 28, which may not be transparent, to contact either plastic layer 30, if transparent, or covering layer 32 and thus may provide light which is visible through layer 32.

Figure 3:
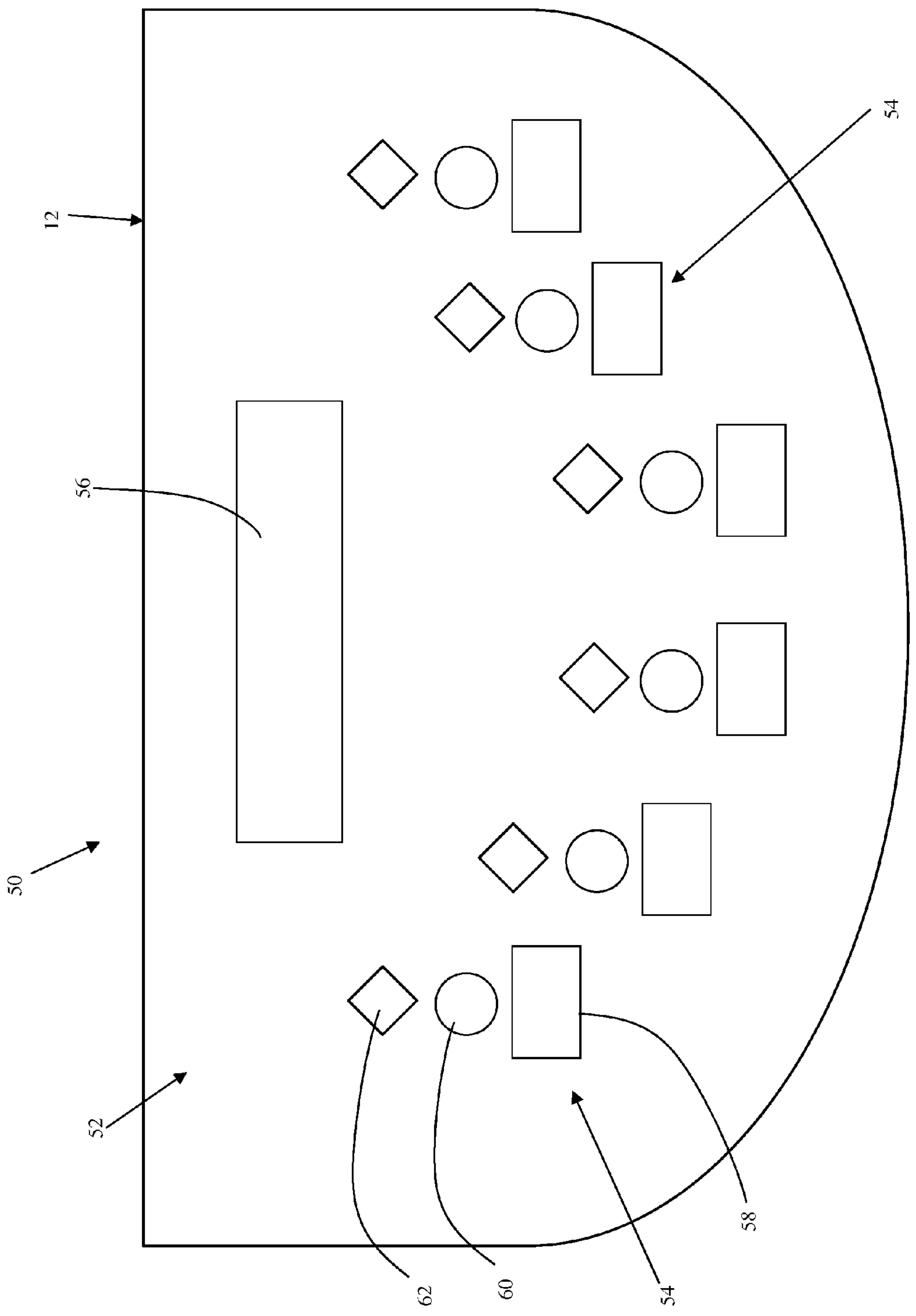
FIG. 3 is top view of a layout provided by a gaming apparatus constructed according to an exemplary embodiment of the invention.

FIG. 3 illustrates a gaming table apparatus 50 configured for operating in accordance with embodiments of the invention. Apparatus 50 illustrates an exemplary layout 52 displayed on table top 12 for use in facilitating the presentment and display of an underlying wagering game. Layout 52 includes multiple player positions 54 and a dealer position 56 defined and illuminated on table top 12 by a display of one or more arrays of LEDs 20 mounted in layer 14. A support structure, such as table legs or a base, may be connected with support layer 16.

For illustrative purposes, the underlying game involves the distribution of randomly ordered cards to form player hands and a dealer hand, and also requires that players place an ante wager while allowing players to place an optional bonus wager. Thus, each player position 54 includes a card receiving position 58, an ante wagering position 60 and a bonus wagering position 62, all of which are defined by the illumination of LEDs 20. Positions 58 and 60 provide designated areas for players to place gaming chips within during play of the underlying game.

It should be understood that various other layout configurations may be provided and presented on gaming table top 12 in any variety of colors, shapes, sequences or patterns, which may be visually appeal to players, provide positions for gaming implements, and facilitate play of a variety of wagering games to be played at a single gaming table apparatus 50. For example, table top 12 may be instructed by a controller or communication device as discussed below to adjust the illuminated locations of player positions 54 on table top 12 based on the amount of players actually at apparatus 50 so that the players can be evenly spaced from one another and comfortably seated. Table top 12 as shown with apparatus 50 is generally semi-circular to accommodate player positions 54 and a dealer position 56 but it should be understood that table top 12 may be a circular shape to accommodate other games or gaming options, such as traditional poker room or baccarat game play.

Table top 12 may further include sensing devices, such as optical sensors, mounted in layer 14 within the areas defined by wagering positions 60 and 62 for detecting the presence of a gaming chip. Apparatus 50 may be configured so that LEDs defining positions 60 and 62 indicate that a gaming chip has been detected, such as by varied illumination sequences or by flashing.

Gaming apparatus 50 may also be configured so that LEDs within layer 14 provide illuminated lighting or messages, which may include, for example, identifying the winning player positions or the awarding of a bonus or a loyalty award.

Figure 4:
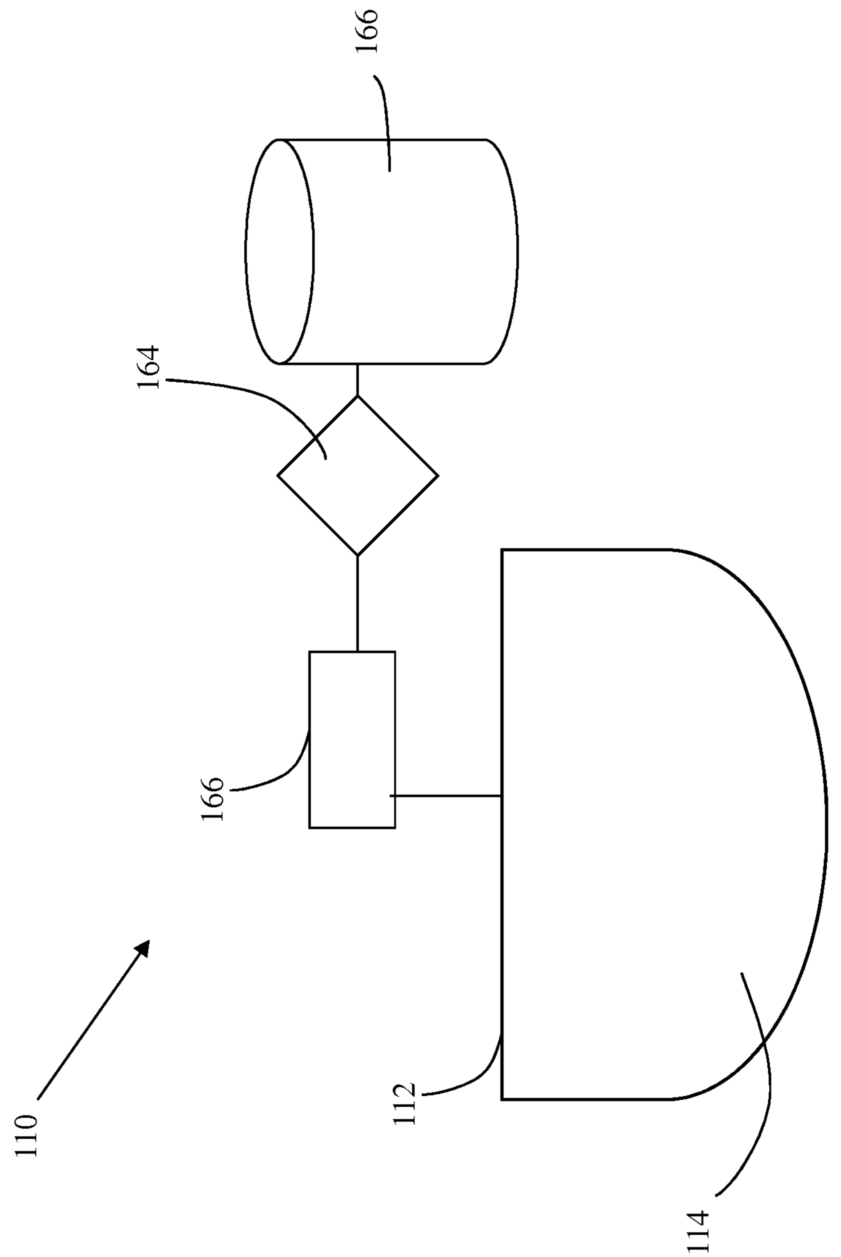
FIG. 4 is a schematic representation of an exemplary system of the invention illustrating some of the operative components for providing the features described herein, among other things.

FIG. 4 illustrates an exemplary gaming platform or system 110 constructed in accordance with some embodiments of the invention. System 110 includes processing device 164 in communication with a database or memory device 166, communication or data input/output device 168 and a display device layer 114 associated with a gaming table top 112, such as those described herein. Memory device 166 may include display data relating to various underlying games, preset game layouts to be defined by illuminating certain illumination devices mounted in substrate 22 to form patterned displays of game layouts with player positions, such as layout 52, and store information about game play or programs for facilitating other illumination displays, such as bonus or game result information. Memory device 166 is in communication with a controller or processing device 164 for accessing the data and directing the illumination of display devices, such as one or more LEDs or LED arrays, mounted in display device layer 114. A communication device 168, which may be a touchscreen display, is in communication with memory device 166 via processing device 164 and configured for providing information regarding the program and game layouts stored in memory device 166, receiving a selection of the program and/or underlying preset game layout to be displayed by table top 112 through the illumination of LEDs, and via processing device 164, actuating the illumination of LEDs in layer 114 in the pattern according to the selected preset game layout and/or program. Communication device 168 may further be in communication with a network, such as the casino system, for communication of game related statistics, player tracking information, game results, bonus award information, announcements, messaging displays to players, player specific messages, advertisements, marketing or updated game play data for storage in memory 166, in one or more languages, among other things. Although not shown, it should be understood that system 110 components are in electrical communication with one another through wiring as necessary and a power source. Some or all of these components may be incorporated in a dealer interface panel.

Figure 5:
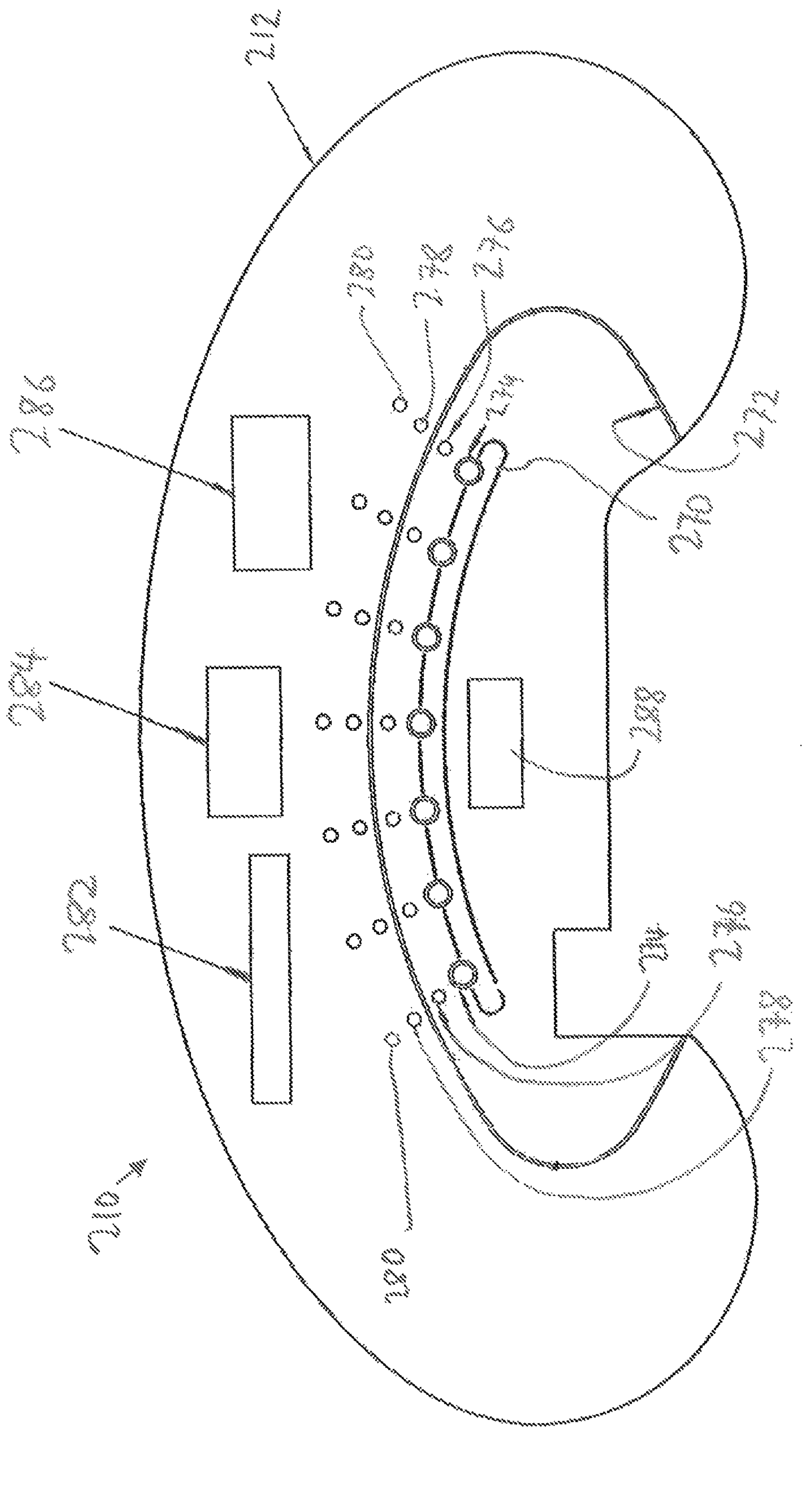
FIG. 5 is top view of another layout provided by a gaming apparatus constructed according to an exemplary embodiment of the invention.

FIG. 5 illustrates another exemplary embodiment of a gaming table apparatus 210 which includes a gaming table top 212 with contour lines 270 and 272 which are shown as being lighted by means of one or more micro-LEDs mounted in gaming table top 212 according to the invention described herein. Wagering positions for placement of gaming chips along curving lines 274, 276, 278 and 280 are also shown as being lighted by one or more micro-LEDs mounted in gaming table top 212. Areas 282, 284, 286 and 288 depict positions where the one or more micro-LEDs mounted in gaming table top may be illuminated to provide various information through the table top, such as game play information, pay table or odds payouts associated with the game, the name of game being placed, game logos or special bonus wagering opportunities.

Exemplary embodiments of a system for providing a customizable illuminated gaming table are described above in detail. The system is not limited to the specific embodiments described herein, but rather, components of the system may be utilized independently and separately from other components described herein.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database or memory device, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database.

This written description uses examples to disclose the invention and also to enable any person skilled in the art to practice the invention, including making and using the devices, apparatus or systems disclosed herein. Those skilled in the art will readily appreciate that the invention may include various computer and network related software and hardware, such as programs, operating systems, memory storage devices, data input/output devices, data processors, servers with links to data communication systems, wireless or otherwise, and data transceiving devices. It should also be understood that the communication, receiving or displaying of data, may further include or involve the transmission, receipt and processing of data through conventional hardware and/or software technology to effectuate the operations as described herein. Those skilled in the art will further appreciate that the precise types of software and hardware used are not vital to the full implementation of the methods of the invention so long as players and/or operators thereof are provided with useful access thereto.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

What is claimed is:

1. A gaming table apparatus comprising:

a substrate layer defining a first surface and having a plurality of cavities;

a plurality of illumination devices mounted within the substrate layer, each illumination device being located relative to a respective one of the plurality of cavities;

a memory device configured to store data relating to one or more preset game layout configurations, wherein each preset game layout configuration may provide positional data relating to one or more designated areas to be defined for the placement of gaming implements which facilitate game play at the gaming table;

a controller device configured to receive a selection of a preset game layout configuration from the one or more preset game layout configurations stored in memory; and a power source responsive to the controller device and in electrical communication with the plurality of illumination devices on the opposing side of the substrate layer from the first surface configured to provide power to cause the illumination of a portion of the plurality of illumination devices corresponding with the selected preset game layout configuration, wherein the gaming table is configured to cause the illumination of a preset game layout configuration as a function of a selection received by the controller device.

2. A gaming table apparatus as recited in claim 1, further comprising a support layer adjacent to the substrate layer.

3. A gaming table apparatus as recited in claim 2, further comprising a base connected with the support layer for supporting the substrate layer horizontally.

4. A gaming table apparatus as recited in claim 1, wherein the illumination devices are LED lights.

5. A gaming table apparatus as recited in claim 1, wherein the designated areas are shapes.

6. A gaming table apparatus as recited in claim 1, wherein the controller device includes a display device and is further configured to provide a display of the preset game layout configurations stored in memory.

7. A gaming table apparatus as recited in claim 1, wherein the plurality of cavities are equidistant from each other.

8. A gaming table apparatus as recited in claim 1, the apparatus further including a protective layer, wherein the protective layer includes a layer of resilient material adjacent to the first surface of the substrate layer and a fabric layer disposed over the layer of resilient material.

9. A gaming table apparatus as recited in claim 8, wherein the protective layer further comprising a layer of a rigid transparent material positioned between the resilient layer and the fabric layer, and each elongated lens contacts the rigid transparent material.

10. A gaming table apparatus as recited in claim 8, wherein the protective layer and substrate layer define a generally semi-circular shaped planar surface.

11. A method of operating a gaming table apparatus including a substrate layer defining a first surface and having a plurality of cavities, a plurality of illumination devices mounted within the substrate layer, each illumination device being located relative to a respective one of the plurality of cavities, a memory device configured to store data relating to one or more preset game layout configurations, a controller device, and a power source responsive to the controller device and in electrical communication with the plurality of illumination devices on the opposing side of the substrate layer from the first surface, the method comprising the steps of:

receiving, through the controller device, a selection of a preset game layout configuration;

retrieving, from the memory device, data related to a present game layout configuration as a function of the selection, wherein each preset game layout configuration may provide positional data relating to one or more designated areas to be defined for the placement of gaming implements which facilitate game play at the gaming table; and providing, through the power source, power to cause the illumination of a portion of the plurality of illumination devices corresponding with the selected present game layout configuration to cause the illumination of a preset game layout configuration as a function of the selection received by the controller device.

12. A method as recited in claim 11, further comprising a support layer adjacent to the substrate layer.

13. A method as recited in claim 12, further comprising a base connected with the support layer for supporting the substrate layer horizontally.

14. A method as recited in claim 11, wherein the illumination devices are LED lights.

15. A method as recited in claim 11, wherein the designated areas are shapes.

16. A method as recited in claim 11, wherein the controller device includes a display device and method further includes the step providing a display of the present game layout configurations stored in memory.

17. A method as recited in claim 11, the apparatus further including a protective layer, wherein the protective layer includes a layer of resilient material adjacent to the first surface of the substrate layer and a fabric layer disposed over the layer of resilient material.

18. A method as recited in claim 17, wherein the protective layer further comprising a layer of a rigid transparent material positioned between the resilient layer and the fabric layer, and each elongated lens contacts the rigid transparent material.

19. A method as recited in claim 17, wherein the protective layer and substrate layer define a generally semi-circular shaped planar surface.

20. A method as recited in claim 17, wherein the plurality of cavities are equidistant from each other.

* * * * *